3,574,666
CERAMIC COATED METAL ARTICLES AND
PROCESS THEREFOR
Howard F. Smalley and Anthony A. Mazzuca, Baltimore, Md., assignors to The Glidden Company, Cleveland, Ohio
No Drawing. Filed Sept. 8, 1967, Ser. No. 666,495
Int. Cl. B32b 15/18
U.S. Cl. 117—70         3 Claims

ABSTRACT OF THE DISCLOSURE

Porcelain enamel coated metal articles resistant to chalking when exposed to water and alkaline materials at temperatures above about 150° F. and methods for producing these articles have been discovered and are described. A novel, clear, virtually unpigmented, vitreous, solution-resistant glass composition is also described. The articles comprise a metal body or ground coated metal body having on at least one surface thereof a continuous base coat of a pigmented porcelain enamel composition and a second coat of the novel, virtually unpigmented, vitreous, clear glass composition. The coatings resist chalking which occurs when conventional porcelain enamel coated articles are exposed to water and alkaline or acid materials at temperatures above 150° F. One embodiment of a coated article is a chalk-resistant liner for automatic dishwashers wherein conventional porcelain enamel coated liners undergo chalking under ordinary use conditions.

---

The invention relates to porcelain enamel coated metal articles, to processes for preparing same, to novel enamel coatings and to novel, clear, solution-resistant glass compositions.

The invention is advantageous in that it provides coated articles which can be used as interiors in appliances in which water, alkaline and acid materials are used at high temperatures such as, for example, in automatic dishwashers. Whereas conventional porcelain enamel finishes tend to chalk or lose their gloss and become powdery when used in such appliances, the novel enamel coatings or finishes of the present invention will generally not undergo chalking during the life of such appliances.

Porcelain enamel coatings have been used for many years in household appliances such as clothes washers and dishwashers, etc. because of the superior life, cleanability and appearance of these coatings. Household appliances coated with conventional porcelain enamel have been suitable in the past because the normal operating temperatures of household appliances have not exceeded 150° F., and porcelain enamel finishes generally can withstand water and alkaline or acid materials such as detergent solutions at such temperatures for prolonged periods of time, usually exceeding the life of the appliance.

However, many modern dishwashers are provided with a so-called sanitizing cycle during which the final rinse water is heated to about 180° F. At such temperatures, conventional porcelain enamels, including those which have been specifically formulated or compounded to withstand hot water and alkaline or acid solutions at temperatures up to 150° F. tend to have a chalky appearance considerably before the expiration of the life of the dishwasher.

The present invention provides novel glass compositions, coatings and coated metal articles which are resistant to chalking when contacted with water, alkaline or acid materials at high temperatures and which will generally retain their gloss and luster for prolonged periods of time, usually during the life of the appliance.

In its broadest aspect, the invention provides a frit composition comprising:

(A) from about 50 to about 60 weight percent of silica,
(B) from about 15 to about 21 weight percent of at least two alkali metal oxides,
(C) from about 7 to about 11 weight percent of boria,
(D) from about 0 to about one weight percent of alumina,
(E) from about 0 to about 0.6 weight percent of molybdena,
(F) from about 5 to about 9 weight percent of zirconia,
(G) from about 3 to about 7 weight percent titania, and
(H) from about one to about 5 weight percent fluorine, and wherein the above percentages total 100.

Glass finishes having the hot water and alkaline and acid-resistant properties hereinbefore described are produced by conventional smelting and porcelain enameling methods from a composition falling within the scope of the generic composition. The composition or finishes are also characterized in having a coefficient of thermal expansion substantially equal to or less than the coefficent of expansion of most known pigmented porcelain enamels which prevents spalling of the glass during cooling and permits the use of these glass compositions as protective coatings or finishes overlaying most other, less resistant known porcelain enamel thereby enabling the latter to withstand the use conditions set forth above without deterioration.

Compositions falling withinthe scope of this invention differ from the clear glass compositions of the prior art in that they have a lower boria content, usually below about 11 percent, and a relatively higher zirconia content, usually from about 5 up to about 9 weight percent, than similar previously known compositions. Conventional clear glass compositions have a boria content which is generally above 13 and can be as high as 20 percent and a zirconia content of from zero to usually about two percent.

Although the reasons for the resistant properties of the glass compositions are not known with certainty, it is believed that the high zirconia content, and the lower boria content, are the most significant single factors which render the glass compositions more resistant to water and alkaline materials at high temperatures than clear porcelain enamel compositions known heretofore.

In the above compositions, if amounts below about 50 weight percent silica are used, the desired hot water resistance will not be obtained. If above about 60 weight percent of silica are employed, the glass composition will have too high a maturing temperature for the intended application.

If less than about 15 weight percent of alkali metal oxides are employed in the compositions, the viscosity of the melted glass obtained during the preparation of the frit and later firing of the coating will be undesirably high. If more than about 21 weight percent of such alkali metal oxides are employed, some of the resistant properties of the glass finish (previously described will be undesirably affected.

A wide variety of alkali metal oxides can be employed including sodium, potassium, lithium, rubidium and cesium oxides. Of these oxides, sodium, potassium and lithium oxides are preferred for economic reasons and combined total metal oxides consisting preponderantly of sodium and potassium are particularly preferred for economic reasons and function in controlling the viscosity of the smelted glass. If desired up to about 5 weight percent of alkaline earth metal oxides (e.g., CaO, SrO, MgO, BaO) can sometimes be substituted for a portion of the alkali metal oxides as described above, without undesirably affecting properties of the novel glass.

Molybdena is used in the minor amounts indicated above to control surface tension of the glass during firing to permit formation of a smooth surface and to inhibit intermixing of the novel clear glass and pigmented cover coat during firing. Alumina is used in small amounts to enhance resistance to alkaline solutions.

An amount of about 5 to about 9 weight percent of zirconia is employed in the compositions of this invention. If less than about 5 percent of zirconia is employed, the resulting glasses will lose a significant amount of their resistance to hot water and/or alkaline materials. If more than about 9 weight percent of zirconia is employed, the glasses will become too refractory for the intended applications.

Heretofore, these and greater quantities of zirconia have been employed in opacified cover coat type porcelain enamels. In these opacified enamels, however, very substantial quantities of the zirconia have remained suspended in the glassy matrix of the porcelain enamel and chalking would result from attack by hot water on the glassy matrix. Such opacified porcelain enamels are not sufficiently resistant to hot water and/or acid or alkaline materials at high temperatures.

From about 7 to about 11 weight percent of boria is employed in compositions falling within the scope of this invention. If less than about 7 weight percent of boria is employed, the glass will have too high a maturing temperature as well as be too high in surface tension. If more than about 11 weight percent of boria is employed, the chemical resistance of the glass will be adversely affected.

As noted above, from about 3 to about 7 weight percent of titania is employed in the compositions of this invention. If less than about 3 weight percent of titania is employed, the glass finishes will not have the acid resistance desired. If more than about 7 weight percent of titania is employed, the resulting glass will be too refractory for intended applications. Fluorine is present in substantially conventional ranges and serves as a flux or a solubilizing agent for the metal oxides of the composition.

A particularly advantageous composition from the standpoint of resistance to hot water, acid and alkaline materials is a frit composition falling within the scope of above-described composition and having an analysis in the ranges listed below:

| Ingredient: | Weight percent |
| --- | --- |
| $SiO_2$ | 50–60 |
| $Na_2O$ | 5–15 |
| $K_2O$ | 4–8 |
| $Li_2O$ | 0–3.0 |
| $B_2O_3$ | 7–11 |
| $Al_2O_3$ | 0.5–1.0 |
| $MoO_2$ | 0–0.6 |
| $ZrO_2$ | 5–9 |
| $TiO_2$ | 3–7 |
| F | 1.5–4.5 | wherein the combined total $K_2O$, $Na_2O$ and $Li_2O$ is from about 15 to about 21 weight percent, and wherein the above percentages total 100.

Such compositions are resistant to solution by water at temperatures up to 260° F. for prolonged periods of time. By way of contrast, conventional high boria- and low zirconia-containing clear frit compositions and finishes made therefrom are significantly more readily dissolved in water at these temperatures. The compositions of this invention are also significantly more resistant than conventional clear frit compositions when they are exposed as glass finishes to water containing alkaline materials such as, for example, synthetic detergents used in dishwashing operations or aqueous acid bleaches used in such operations at temperatures up to 260° F.

The novel, vitreous glass compositions of this invention are conventionally prepared by mixing appropriate salts, oxides and fluorine precursors such as, for example, silica, alkali metal borates, carbonates, nitrates and silicofluorides; zirconium silicate, titania, alumina and molybdena in appropriate theoretical proportions to provide a frit formulation falling within the ranges hereinbefore described. Mixtures of the ingredients are conventionally smelted and the resultant liquid glass is fritted by conventional methods.

As will be hereinafter evident, the novel frit compositions are prepared from the glass and formulated into slips by conventional ball mill grinding procedures. However, in contrast to prior art slips, which usually contain insoluble mill additives such as quartz, clays, opacifiers and alkali and/or alkaline earth metal salts which remain suspended in the glass after the slip is applied to an article and fired, the mill additives employed to form the slips of the novel frit composition of this invention are substantially fugitive, that is, they are decomposed or converted into products which are essentially soluble in the glass finish.

As will be evident to those skilled in the art, conventional glass colorants such as cobalt oxide may be added to the novel frit compositions of this invention to provide color to the finished surface, provided such colorants are added in amounts such that they will dissolve in the finished glass.

In another aspect, the present invention provides a coated metal article comprising a metal body having on at least one surface thereof a continuous procelain enamel base coat of a pigmented porcelain enamel composition and a second continuous coat of the aforedescribed novel, virtually unpigmented, clear glass composition. As will be hereinafter evident, the coatings on such coated articles when exposed to water and/or alkaline materials at temperatures above about 150° F. and up to as high as 260° F. do not chalk but retain their luster.

The base coating of the coated article of this invention comprises a conventional pigmented porcelain enamel of the type used in coating household appliances such as washing machines and dishwashers. Such enamels usually contain, in addition to the glass matrix, suspended pigmentary materials and opacifiers such as titanium dioxide or zirconium dioxide; inorganic colorants; refractory materials such as silicon dioxide; and clays which are usually used as suspending agents in milling the glass to form porcelain enamel slips. As previously noted, finishes made from these conventional pigmented enamel compositions tend to become dull and exhibit a chalky appearance in a relatively short time when used under conditions such that the surfaces are exposed to water, alkaline or acid materials at temperatures above about 150° F. Such porcelain enamel finishes have a worn appearance and loss of cleanabilty.

The thickness of the first coat, that is, the pigmented porcelain enamel coat, may vary considerably but is desirably between about 2 to about 5 mils in thickness. If the pigmented porcelain enamel coat is less than about 2 mils in thickness, its decorative properties will be adversely affected. Although the pigmented coat may sometimes be thicker than about 5 mils there is usually no advantage and coats thicker than 5 mils are usually uneconomical due to the relatively large amount of porcelain enamel slip required.

The thickness of the second coat or novel, vitreous, clear glass composition can vary from about one to about 3 mils. If the coating is less than about one mil in thickness chalking may sometimes occur under end-use conditions before the expiration of the useful life of the appliance. Although the thickness of the clear coat may sometimes be greater than 3 mils there is usually no advantage and such coating thickness can be economically disadvantageous.

In another aspect the invention provides a process for producing the chalk-resistant porcelain enamel coated metal articles hereinbefore described. The process comprises the steps of:

(A) Applying a first coat of a pigmented porcelain enamel composition to at least one surface of the metal article, either direct to the steel or over a conventional fired ground coat, (B) Applying a second coat of the hereinbefore described novel, virtually unpigmented, vitreous, clear glass composition over the first coat, and (C) Firing the article so coated.

As will be evident from the specific examples, the first coat may comprise any opacified or pigmented porcelain enamel conventionally applied to metal articles. As previously noted, such porcelain enamels are decorative in nature but are not sufficiently resistant to water, acid and alkaline materials at temperatures above about 150° F.

Depending upon the nature of the metal to be coated, it may be necessary to apply a ground coat which is also a porcelain enamel type composition and which will promote the adherence of the first coat to the metal. If the ground coat is not applied, the metal to be used must usually be the extra low carbon steels produced specifically for direct-on cover coat porcelain enamel application to prevent gas type defects in the glassy coatings.

The conventional pigmented porcelain enamel first coat is applied as a porcelain enamel slip by spraying, roller coating, dipping, flow-coating, or the like. After its application the coating can be dried and fired to produce a decorative but not chalk-resistant porcelain enamel finish on the metal article. The novel, virtually unpigmented, vitreous, clear glass composition is then applied as a slip or slurry over the fired porcelain enamel coating by any of the above-described procedures and the article again fired to produce the coated metal article of this invention.

Alternatively, and preferably, the first pigmented coat is applied to the metal article, or ground coated metal article, and the second clear, unpigmented coat applied over the unfired first coat. The coated metal article can then be dried and fired to produce a resistant coated metal article having the properties above-described.

The amount of the pigmented porcelain enamel and clear glass slips applied to the metal article, whether a one-fire or a two-fire procedure is employed, can vary considerably, but in each instance, the amount should be one sufficient to provide fired coatings having thicknesses within the ranges hereinbefore described. As will be evident to those skilled in the art, the resistant, coated, metal article of this invention can be prepared by a one, two or three-fire process, the two-fire process, in which the ground coat fire is the first fire, being preferred for economic reasons. The firing of the article is carried out by conventional porcelain enamel firing procedures.

The following specific examples are intended to illustrate the invention but not to limit the scope thereof, parts and percentages being by weight unless otherwise specified.

EXAMPLE 1

A conventional, self-pigmenting, porcelain enamel frit having the composition listed in Table I below was prepared.

TABLE I

Self-pigmented porcelain enamel frit

| Ingredient: | Percent by weight |
| --- | --- |
| $SiO_2$ | 40.6 |
| $Na_2O$ | 9.1 |
| $K_2O$ | 6.9 |
| $Li_2O$ | 0.9 |
| $B_2O_3$ | 13.9 |
| $Al_2O_3$ | 0.3 |
| $As_2O_3$ | 0.1 |
| $ZrO_2$ | 3.3 |
| $TiO_2$ | 19.0 |
| $P_2O_5$ | 1.2 |
| F | 4.8 |

Porcelain enamel slip formulations containing the ingredients in the amounts listed in Table II below were prepared by grinding the frit in a conventional ball mill until the frit had a particle size such that 95 percent of the frit particles passed through a No. 325 Mesh Standard Screen.

TABLE II

Self-pigmented porcelain enamel slip composition

| Ingredient: | Amount (pounds) |
| --- | --- |
| Enamel frit | 100 |
| Clay | 5 |
| Bentonite | 3/16 |
| Opacifier, $TiO_2$ | 2 |
| $K_2CO_3$ | 1/4 |
| Setit A [1] | 3/16 |
| Keltex [2] | 1/32 |
| Water | 40 |

[1] Hydrous alumina.
[2] Sodium alginate.

A novel, clear glass was prepared by intimately mixing the ingredients in the amounts listed in Table III.

TABLE III

| Ingredient: | Amount (pounds) |
| --- | --- |
| $SiO_2$ | 842 |
| $Na_2B_4O_7$ | 219 |
| $Na_2CO_3$ | 196 |
| $KNO_3$ | 58 |
| $Na_2SiF_6$ | 34 |
| $Li_2CO_3$ | 68 |
| $ZrSiO_4$ | 174 |
| $TiO_2$ | 80 |
| $Al_2O_3$ | 13 |
| $MoO_3$ | 7 |
| $K_2SiF_6$ | 142 |

The above mixture was charged to a standard porcelain enamel frit smelter maintained at a temperature of 2300° F. and heated at that temperature for 3½ hours. The resultant, clear, liquid glass was discharged from the smelter, quenched and had the oxide composition listed in Table IV below.

TABLE IV

| Ingredient: | Percent by weight |
| --- | --- |
| $SiO_2$ | 56.7 |
| $Na_2O$ | 11.5 |
| $K_2O$ | 5.2 |
| $Li_2O$ | 1.6 |
| $B_2O_3$ | 9.1 |
| $Al_2O_3$ | 0.9 |
| $MoO_2$ | 0.4 |
| $ZrO_2$ | 7.0 |
| $TiO_2$ | 4.8 |
| F | 2.8 |

Glass slip formulations having the ingredients in the amounts listed in Table V were prepared by milling the glass frit described in Table IV until the frit particles had a particle size such that 99 percent passed through a No. 325 Mesh Standard Screen.

TABLE V

| Ingredient: | Amount (grams) |
| --- | --- |
| Frit | 100 |
| Bentonite | .03 |
| $NaNO_2$ | .03 |
| Water | 28.0 |
| Ethyl alcohol, denatured | 11.3 |

EXAMPLE 2

The enamel slip formulation in Table II was sprayed onto one surface of each of a series of 10 ground coated enameling iron plates using the ground coat shown in Table VI. The amount of enamel slip formulation applied to each plate was 25 grams (dry solids) per square foot of the coated surface of the plates.

Five of the ten plates (hereinafter designated Series I) were dried and fired in a standard enameling furnace to produce a pigmented porcelain enamel coating having a thickness of 4 mils.

Five of the ten plates (hereinafter designated Series II) were coated by spraying with the slip formulation described in Table V. The formulation was applied over the pigmented porcelain enamel coating. The amount of clear glass slip used was 12 grams (dry solids) per square foot of coated plate surface. The Series II plates were dried and fired in a standard enameling furnace to produce coated plates having a coating thickness of 2 mils in addition to the ground coat and base coat.

TABLE VI

Ground coat frit composition

| Ingredient: | Percent by weight |
|---|---|
| $SiO_2$ | 46.0 |
| $Na_2O$ | 15.7 |
| $K_2O$ | 2.3 |
| $Li_2O$ | 0.4 |
| $B_2O_3$ | 17.2 |
| BaO | 2.0 |
| CaO | 5.1 |
| $Al_2O_3$ | 5.1 |
| $P_2O_5$ | 0.2 |
| CuO | 0.1 |
| $Co_3O_4$ | 0.7 |
| NiO | 1.1 |
| $MnO_2$ | 0.6 |
| F | 3.5 |

EXAMPLE 3

The Series I and Series II high gloss, porcelain enamel coated, metal plates of Example 2 were weighed, the weights recorded, and the plates were then placed in an autoclave maintained at a temperature of 260° F. for 72 hours. The plates were then removed from the autoclave, observed for chalking, scrubbed with a brush to remove loosely adhering residues, dried to constant weight to remove water, re-weighed and observed for appearance. The results are shown in Table VII below.

TABLE VII

| | Weight loss, (mg./in.²) | Appearance |
|---|---|---|
| Coated plates | | |
| Series I | 26.2 | Chalky, dull. |
| Series II | 6.2 | Glossy. |

EXAMPLE 4

Two formed dishwater tubs were respectively coated using the coating procedures employed for the Series I and Series II metal plates of Example 2. When assembled in dishwashers, the tub coated with the second coating (e.g. clear glass slip formulation) retained its appearance after 1,000 cycles of use whereas the tub coated with the pigmented porcelain enamel coating only became chalky within 200 use cycles.

EXAMPLE 5

The following example is included to point out the difference in composition and resistance to water at high temperatures of the novel, clear glass compositions of this invention compared with conventional, clear porcelain enamel compositions.

Ten plates were coated using the procedures and coating materials described in Example 2. Thereafter, the five coated plates corresponding to the Series I plates of that example were additionally coated with a conventional high boria-low zirconia, unpigmented, clear glass composition having the ingredients in the amounts listed in Table VIII below.

TABLE VIII

Conventional clear porcelain enamel

| Ingredient: | Percent by weight |
|---|---|
| $SiO_2$ | 49.9 |
| $Na_2O$ | 7.7 |
| $K_2O$ | 9.7 |
| $Li_2O$ | 1.1 |
| $B_2O_3$ | 15.4 |
| $Al_2O_3$ | 0.2 |
| $ZrO_2$ | 3.3 |
| $TiO_2$ | 8.7 |
| F | 4.0 |

The ten coated plates were conventionally fired and subjected to the autoclave treatment described in Example 3. After exposure the plates were re-weighed and observed as described in Example 3.

The conventional composition which contained high boria-low zirconia showed a weight loss of 30 milligrams per square inch while the plates which were coated by the low boria-high zirconia-containing compositions of this invention showed a weight loss of 8.3 milligrams per square inch.

The terms "metal article" or "metal article surface" as used herein are intended to mean nad to refer to a metal workpiece having uncoated metal surfaces or to a metal workpiece whose surface has been pre-coated with a conventional ground coat.

The novel coatings of this invention are usually applied to steel which has been conventionally pre-coated with a ground coat. In some instances (e.g., in the case of very low carbon steels) the coating compositions of this invention can be applied directly to the metal. However, the more widely used steels usually contain sufficient carbon to cause excessive gas-type defects during firing procedures and thus usually require a base ground coat.

The chalk resistance of the coated metal articles of this invention is believed to be due to the resistance to solution in hot water of the clear glass compositions of this invention and to the absence of discrete particles in the glass coating which would result in chalking upon solution of the glass by hot water.

What is claimed is:

1. A coated article comprising a metal body having on at least one surface thereof a continuous porcelain enamel base coat comprising a pigmented porcelain enamel composition and a second continuous coat comprising a virtually unpigmented clear glass composition, said clear glass composition comprising:
   (a) from about 50 to about 60 weight percent of silica,
   (b) from about 15 to about 21 weight percent of at least two alkali metal oxides,
   (c) from about 7 to about 11 weight percent of boria,
   (d) from about 0 to about one weight percent of alumina,
   (e) from about 0 to about 0.6 weight percent of molybdena,
   (f) from about 5 to about 9 weight percent of zirconia,
   (g) from about 3 to about 7 weight percent of titania,
   (h) from about one to about 5 weight percent of fluorine, and wherein said weight percentages total 100.

2. The article of claim 1 wherein said first coat has a thickness of between about 2 to about 5 mils and the second coat has a thickness of between about one to about 3 mils.

3. The article of claim 2 wherein said second coat comprises a virtually unpigmented, clear, vitreous, glass composition having an analysis within the ranges listed below:

| Ingredient: | Weight percent |
| --- | --- |
| $SiO_2$ | 50–60 |
| $Na_2O$ | 5–15 |
| $K_2O$ | 4–8 |
| $Li_2O$ | 0–3.0 |
| $B_2O_3$ | 7–11 |
| $Al_2O_3$ | 0.5–1.0 |
| $MoO_2$ | 0–0.6 |
| $ZrO_2$ | 5–9 |
| $TiO_2$ | 3–7 |
| F | 1.5–4.5 | wherein the combined total of said $Na_2O$, $K_2O$, and $Li_2O$ is from about 15 to about 21 percent, and wherein the above percentages total 100.

References Cited

UNITED STATES PATENTS

| | | | |
| --- | --- | --- | --- |
| 1,017,360 | 2/1912 | York | 117—70(C) |
| 1,498,657 | 6/1924 | Hurd | 117—70(C)X |
| 2,882,173 | 4/1959 | Welsch | 106—54X |
| 3,062,685 | 11/1962 | Sanford et al. | 117—70(C)X |
| 3,278,324 | 10/1966 | Nelson | 117—70(C)X |

FOREIGN PATENTS

| | | | |
| --- | --- | --- | --- |
| 614,373 | 2/1961 | Canada | 106—54 |
| 1,021,710 | 3/1966 | Great Britain | 117—70(B) |

OTHER REFERENCES

Materials For Ceramic Processing in Ceramic Industry Magazine, January 1967, p. 84.

ALFRED L. LEAVITT, Primary Examiner

C. K. WEIFFENBACH, Assistant Examiner

U.S. Cl. X.R.

106—54; 117—129